July 29, 1952            G. BENNETT            2,604,723
INSECT CATCHER
Filed April 9, 1949
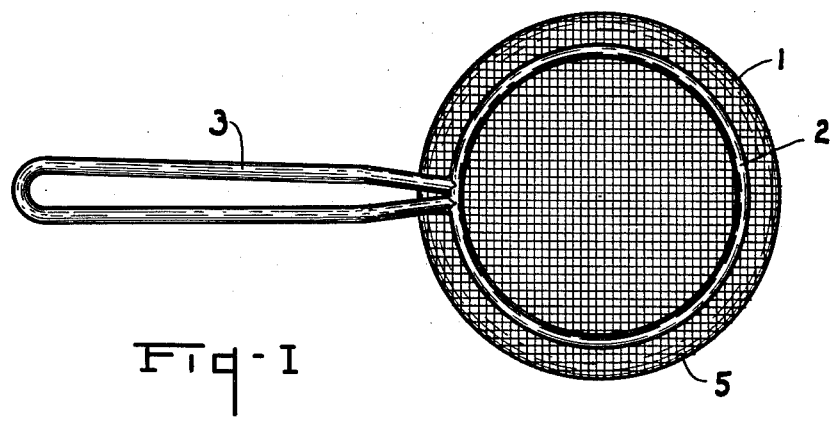
Fig-I
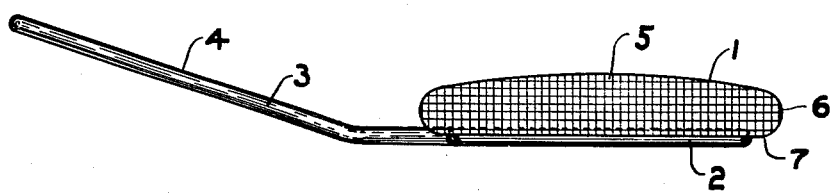
Fig-II
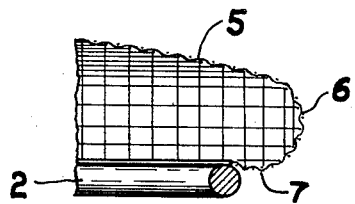
Fig-III
INVENTOR
George Bennett
BY Roy A. Plant
ATTORNEY Patented July 29, 1952

2,604,723

UNITED STATES PATENT OFFICE 2,604,723

INSECT CATCHER

George Bennett, Bronson, Mich.

Application April 9, 1949, Serial No. 86,421

5 Claims. (Cl. 43—133)

The present invention relates broadly to catching devices, and in its specific phases to a live cricket catcher.

The catching of live bugs and insects in the past has involved the use of nets commonly known as butterfly nets, or traps of one type or another which almost universally involve the use of a small opening into the closed compartment of the trap, wherein the inlet of such opening is easy for the insect to find and crawl through, but the outlet to same is hard to find due to being small and at a location such as on the tip of a cone or the like.

The catching of crickets involves an entirely different problem from that of the trapping of flies and bugs, and the above noted catching procedures are unsatisfactory for them. Crickets are used for fishing and are somewhat difficult to catch due to their crawling and jumping habits. They also have long jumping legs which are rather fragile and, moreover, if a cricket has lost a leg or legs it immediately becomes less suitable for use as bait and is unsalable by the bait supplier. The almost universal procedure for catching crickets has been to catch them with bare hands which results in a high percentage becoming valueless due to loss of a leg or legs. It was a recognition of these problems and difficulties encountered in the catching and marketing of crickets which led to the conception and development of the present invention.

Accordingly among the objects of the present invention is the provision of a cricket catcher which does not mutilate the crickets and which makes it unnecessary to directly handle them, either in the initial catching or in the subsequent recatching in the dealer's cricket box for sale to fishermen.

Another object is to provide a cricket catcher which has a face which is always open, and through which crickets may be caught and discharged.

Another object is to provide an open face cricket catcher wherein several crickets can be caught as a group, or even one at a time, and temporarily kept in the catcher before being placed in the cricket storage container.

A further object is to provide an open face cricket catcher wherein same is made with a screen body which has a substantially flat panel opposite the open face of the assembly, and a reverse turned substantially balloon shaped edge which extends from that panel to an open frame which forms the margin of the open face of the assembly.

A further object of the present invention is to provide a cricket catcher which is simple in construction, inexpensive, and easily manufactured, efficient, and easy to use.

Still further objects and advantages of the present invention will appear as the description proceeds.

To the accomplishment of the foregoing and related ends the invention, then, consists of the means hereinafter fully described and particularly pointed out in the claims, the annexed drawing and the following description setting forth in detail certain means for carrying out the invention, such disclosed means illustrating, however, but one of various ways in which the principle of the invention may be used.

In the annexed drawing:

Figure 1 shows a bottom assembly view of a preferred form of the present catching device.

Figure 2 shows an elevational edge view of the assembly shown in Figure 1.

Figure 3 shows an enlarged section view of one edge of a preferred form of the assembly shown in Figure 1.

Referring more particularly to the drawing the construction shown is particularly adapted for use in catching crickets in open fields, and later for recatching them in the bait supplier's cricket box for sale to fishermen and the like. The catching assembly 1 is provided with a frame member 2 which is of ring-like construction, and preferably made of relatively stiff metal wire as shown in Figure 3 and of round or oval shape. Connected to this frame is a handle 3, one convenient form of which has an angularly bent up portion 4 which allows the user to readily grip the handle while frame member 2 is flat on the ground.

Mounted in conventional manner on the upper face of frame member 2 is a hollow, open-faced, screen member 5 of general pancake shape which is approximately flat on its upper face, although same may be bulged if desired. The edges 6 of this screen member are preferably of curved or balloon shape as shown and extend outward beyond frame member 2 in order to help hold the crickets after catching. The edge 6 of the screen preferably has a small downward extension 7 overhanging frame 2, as is shown in Figures 2 and 3, since this also facilitates the prevention of escape of captured crickets. In the use of a cricket catcher having this balloon shaped edge 6 and downward extension 7 the captured cricket, it has been found, runs along the screen to the balloon shaped edge where the peculiar form of same either causes the cricket to run around balloon edge 6 or reverse himself and run back across the face of the screen without coming up out of the balloon edge of the screen and over frame 2 which would permit immediate escape. The screen used in this assembly, which, as shown in Figures 1 and 2, may be of the typical fly screen type, may be of wire, plastic screen, or the like. This screen, which is relatively stiff due to its form and shape, should be dark colored and preferably black since with that type of screen tests have shown that the cricket prefers to walk over it rather than to jump out of the opening through frame 2.

A preferred construction of the present apparatus, as illustrated in the drawing, involves the use of a round ring frame member approximately 4⅜" in inside diameter with a handle approximately 6" long and having the outer end of the handle bent upward approximately 1¾". The screen member is dark colored and preferably 5¾" across and about 1" from the top of the screen to the bottom of frame 2 which results in a balloon edge portion having a radius of approximately one-half inch. With this construction the apparatus is not only easy to use for catching crickets but if the caught crickets have to be carried some little distance to the cricket receiving receptacle, the opening through frame 2 is such that same can be closed with the palm of the ordinary adult hand so that the crickets cannot escape. When the cricket receiving can is reached it is only necessary to remove the hand and tap frame 2 onto the upper edge of the cricket receiving can to shake the crickets off the screen and into the can. It is thus to be seen that it is unnecessary to manually handle the crickets and accordingly they are not physically injured. The same procedure is followed at the bait supplier's shop where this same cricket catcher is used to catch crickets in his cricket storage box for placing in the carrying receptacle of the purchaser since here again there is no need of manually handling the crickets and they are thus in first class physical condition for use in fishing.

Other modes of applying the principle of my invention may be employed instead of those explained, change being made as regards the apparatus herein disclosed, provided the means stated by any of the following claims or the equivalent of such stated means be employed.

I therefore particularly point out and distinctly claim as my invention:

1. An insect catching device of the character described, which comprises a relatively rigid ring-like frame member, and a relatively stiff hollow screen member having a substantially balloon shaped edge portion and an open side, said balloon shaped edge portion of said screen member being fastened to said frame member so as to extend outward from the frame to a substantially larger diameter than said frame member, and then upward and back inward to form the closed side of said screen member.

2. An insect catching device of the character described, which comprises a relatively rigid ring-like frame member, a handle joined to said frame member and extending sidewise from the edge of same, and a generally pancake shaped and relatively stiff hollow construction screen member having an open side, the edge of said screen being fastened along the edge of its open side to said frame member, said screen extending outward relatively concentrically from said frame to a substantially larger diameter than said frame member, and then curving upward and back inward to form the closed side of said screen member.

3. A cricket catching device, which comprises a relatively rigid ring-like frame member, a handle fixedly joined to said frame member and extending sidewise from the edge of same substantially in the plane of said frame member, and a relatively stiff upstanding hollow construction screen member having an open side, the edge of said screen being fastened along the edge of its open side to said frame member, said screen member extending outward relatively concentrically from the frame to a substantially larger diameter than said frame member, and then curving upward and back inward to form a balloon shaped edge for said screen member, said edge terminating in and forming part of the closed side of said screen member.

4. A cricket catching device of the character described having a relatively rigid ring-like frame and a balloon edged relatively stiff upstanding screen member which is substantially flat and closed on one side and wide open through said frame on the other, and wherein said screen, in the balloon edge portion of same has a cross section radius of approximately a half inch in the portion extending from said frame to said closed side, and is of a substantially larger outside diameter than said frame and also depends slightly over the edge of said frame to form a turning pocket for a captured cricket.

5. A cricket catching device, which consists of a relatively rigid ring-like frame member, a handle fixedly joined to said frame member and extending sidewise from the edge of same substantially in the plane of said frame member, a major portion of the free end portion of said handle having a longitudinal axis angularly disposed with respect to the longitudinal axis of the other end of said handle to facilitate holding said handle when the ring-like portion of said frame rests on a substantially flat surface, and a relatively stiff upstanding hollow construction dark-colored screen member having one unobstructed open side, the edge of said open side of the screen member being fastened along the edge of said ring-like frame member, said screen member extending outward substantially concentrically from said ring-like frame member to a substantially larger diameter than said frame member, said diameter being in the neighborhood of one inch greater than said ring-like frame, said screen then curving upward in the same direction as said handle is offset to complete a balloon shaped edge terminating in and forming part of the closed side of said screen member, said balloon shaped edge at said frame member depending over same slightly and then gradually curving outward, upward, and backward to complete the balloon shaped edge wherein the latter has a radius of approximately one-half inch.

GEORGE BENNETT.

REFERENCES CITED

The following references are of record in the file of this patent:

UNITED STATES PATENTS

| Number | Name | Date |
|---|---|---|
| 229,230 | Anderson | June 29, 1880 |
| 1,462,416 | McDermott | July 17, 1923 |
| 1,581,750 | Mantilla | Apr. 20, 1926 |
| 1,681,006 | Merton | Aug. 14, 1928 |
| 1,718,805 | Wilkie et al. | June 25, 1929 |
| 2,189,565 | Jones | Feb. 6, 1940 |

FOREIGN PATENTS

| Number | Country | Date |
|---|---|---|
| 9,029 | Great Britain | 1909 |
| 9,616 | Great Britain | 1915 |